United States Patent
Jeon et al.

(10) Patent No.: US 10,120,114 B2
(45) Date of Patent: Nov. 6, 2018

(54) LIGHT CONVERSION MEMBER, AND BACKLIGHT UNIT AND DISPLAY DEVICE INCLUDING THE SAME

(71) Applicant: LG ELECTRONICS INC., Seoul (KR)

(72) Inventors: Seongman Jeon, Seoul (KR); Jinmok Oh, Seoul (KR); Moongoo Choi, Seoul (KR); Hyunkwon Shin, Seoul (KR); Jinwoo Sung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 14/734,756

(22) Filed: Jun. 9, 2015

(65) Prior Publication Data

US 2016/0223732 A1 Aug. 4, 2016

Related U.S. Application Data (60) Provisional application No. 62/111,716, filed on Feb. 4, 2015.

(30) Foreign Application Priority Data

Apr. 1, 2015 (KR) .................. 10-2015-0046509

(51) Int. Cl.
*G01J 1/58* (2006.01)
*F21V 8/00* (2006.01)
(Continued)

(52) U.S. Cl.
CPC .......... *G02B 6/0003* (2013.01); *G02B 6/0011* (2013.01); *G02F 1/133609* (2013.01); *G02F 2/02* (2013.01); *B82Y 20/00* (2013.01); *G02B 6/0068* (2013.01); *G02B 6/0073* (2013.01); *G02F 2001/133614* (2013.01);
(Continued)

(58) Field of Classification Search
CPC .......... B82Y 20/00; B82Y 30/00; B82Y 5/00; B82Y 40/00; G02B 6/0073; G02B 6/0003; G02B 6/0011; G02B 6/0068; G02B 6/0076; G02B 6/4207; G02F 1/133609;
(Continued)

(56) References Cited

U.S. PATENT DOCUMENTS 7,808,640 B2 * 10/2010 Fritz .................. G01N 21/1702
356/432
9,719,639 B2 * 8/2017 Gu ............................ F21K 9/60
(Continued)

FOREIGN PATENT DOCUMENTS

JP 2014-142367 A 8/2014
KR 10-2012-0109913 A 10/2012
(Continued)

*Primary Examiner* — Taeho Jo
(74) *Attorney, Agent, or Firm* — Birch, Stewart, Kolasch & Birch, LLP (57) ABSTRACT

A light conversion member having excellent reliability and white balance characteristics, and a backlight unit and a display device including the same are provided. The light conversion member according to the present disclosure includes at least one light conversion layer including quantum dots and at least one band-pass filter which reduces transmittance of light having a wavelength band of 480 nm or more.

4 Claims, 5 Drawing Sheets

(51) Int. Cl.
*G02F 1/1335* (2006.01)
*G02F 2/02* (2006.01)
*B82Y 20/00* (2011.01)

(52) U.S. Cl.
CPC ............ *G02F 2001/133624* (2013.01); *G02F 2203/055* (2013.01)

(58) Field of Classification Search
CPC ... G02F 2001/133614; G02F 1/133603; G02F 2202/36; G02F 2203/055; G02F 2/02
USPC .................................................... 250/483.1
See application file for complete search history.

(56) References Cited

U.S. PATENT DOCUMENTS

| | | | | |
|---|---|---|---|---|
| 2005/0116619 | A1* | 6/2005 | Kuma | H01L 27/322 313/503 |
| 2009/0085478 | A1* | 4/2009 | Cok | H01L 27/3213 313/506 |
| 2012/0113672 | A1* | 5/2012 | Dubrow | B82Y 20/00 362/602 |
| 2012/0250351 | A1* | 10/2012 | Shin | G02F 1/133603 362/608 |
| 2012/0252534 | A1 | 10/2012 | Kim et al. | |
| 2012/0287381 | A1* | 11/2012 | Li | G02F 1/133617 349/106 |
| 2013/0215136 | A1 | 8/2013 | Jiao et al. | |
| 2013/0242228 | A1* | 9/2013 | Park | G02F 2/02 349/61 |
| 2013/0277643 | A1* | 10/2013 | Williamson | H01L 27/156 257/13 |
| 2013/0335677 | A1* | 12/2013 | You | G02F 1/133609 349/65 |
| 2014/0036203 | A1 | 2/2014 | Guillou et al. | |
| 2014/0078716 | A1* | 3/2014 | Ninan | F21V 9/40 362/84 |
| 2014/0091275 | A1* | 4/2014 | Coe-Sullivan | H01L 51/5268 257/13 |
| 2014/0119049 | A1* | 5/2014 | Kim | G02B 6/005 362/607 |
| 2014/0135570 | A1* | 5/2014 | Blair | G02C 7/104 600/27 |
| 2014/0153280 | A1 | 6/2014 | Lee | |
| 2014/0160569 | A1* | 6/2014 | Blair | G02C 7/104 359/589 |
| 2014/0168576 | A1* | 6/2014 | Lee | H01J 29/90 349/71 |
| 2014/0264412 | A1* | 9/2014 | Yoon | H01L 33/504 257/98 |
| 2014/0327967 | A1* | 11/2014 | Blair | A61N 5/0618 359/589 |
| 2014/0368766 | A1* | 12/2014 | Shibata | G02B 5/201 349/61 |
| 2015/0002528 | A1* | 1/2015 | Bohn | G02B 27/0172 345/589 |
| 2015/0048348 | A1* | 2/2015 | Huang | H01L 27/322 257/40 |
| 2015/0072454 | A1* | 3/2015 | Kim | H01L 51/003 438/28 |
| 2015/0076492 | A1* | 3/2015 | Kubota | H01L 27/1225 257/43 |
| 2015/0085223 | A1* | 3/2015 | Park | G02F 1/133615 349/65 |
| 2015/0085490 | A1* | 3/2015 | Miller | C09K 11/02 362/259 |
| 2015/0168616 | A1* | 6/2015 | Blair | G02B 5/008 359/885 |
| 2015/0228232 | A1* | 8/2015 | Lee | G09G 3/3607 345/88 |
| 2015/0285969 | A1* | 10/2015 | Kim | G02B 5/201 359/891 |
| 2015/0300600 | A1* | 10/2015 | Dubrow | B82Y 20/00 362/330 |
| 2015/0355399 | A1* | 12/2015 | You | G02B 6/005 349/65 |
| 2016/0003998 | A1* | 1/2016 | Benoit | G02F 1/133502 349/71 |
| 2016/0062009 | A1* | 3/2016 | Wach | A61B 5/0084 427/164 |
| 2016/0077382 | A1* | 3/2016 | Yasunaga | H05B 33/14 362/19 |
| 2016/0084476 | A1* | 3/2016 | Koole | C09K 11/02 362/84 |
| 2016/0093677 | A1* | 3/2016 | Tseng | G02B 5/201 362/84 |
| 2016/0146993 | A1* | 5/2016 | Kumagai | G02B 5/285 359/359 |
| 2016/0284745 | A1* | 9/2016 | Park | H01L 27/1462 |

FOREIGN PATENT DOCUMENTS

| | | |
|---|---|---|
| KR | 10-2013-0009027 A | 1/2013 |
| KR | 10-2014-0037760 A | 3/2014 |

\* cited by examiner

LIGHT CONVERSION MEMBER, AND BACKLIGHT UNIT AND DISPLAY DEVICE INCLUDING THE SAME

CROSS-REFERENCE TO RELATED APPLICATIONS

This application claims the benefit of U.S. Provisional Application No. 62/111,716, filed on Feb. 4, 2015 entitled "QUANTUM DOT FILM HAVING AN EXCELLENT RELIABILITY" and Korean Patent Application No. 10-2015-0046509, filed on Apr. 1, 2015 entitled "LIGHT CONVERSION MEMBER, BACKLIGHT UNIT AND DISPLAY DEVICE COMPRISING THE SAME", which are all hereby incorporated by reference in their entirety into this application.

BACKGROUND

The present disclosure relates to a light conversion member using quantum dots, and a backlight unit and a device including the same, and more particularly, to a light conversion member having excellent reliability, quantum efficiency, and white balance characteristics, and a backlight unit and a device including the same.

Recently, with the development of information technology, display technologies also have been rapidly developed. Accordingly, flat panel display (FPD) devices having advantages in term of thinness, light weight, and low power consumption, which include liquid crystal display (LCD) devices, plasma display panel (PDP) devices, electroluminescence display (ELD) devices, field emission display (FED) devices, and the like, have been developed and have replaced conventional cathode ray tubes (CRTs).

Among these devices, liquid crystal display devices have attracted attention as a next generation advanced display device which is characterized by low power consumption, good portability, highly integrated technology, and highly added value.

The liquid crystal display device is not self-luminescent, but a photoreceptive type display device which displays images by light incident from the outside, so that a light source is essentially required. Conventionally, cold cathode fluorescent lamps (CCFLs) have been mainly used as a light source of the liquid crystal display device. However, the cold cathode fluorescent lamps have shortcomings in terms of luminance uniformity and color purity if the liquid crystal display device is large-sized.

Therefore, instead of the cold cathode fluorescent lamp, tri-color light-emitting diodes (LEDs) are being recently used as a light source of the liquid crystal display device. When tri-color light-emitting diodes are used as a light source, there are advantages in that high quality images may be realized due to reproducible high color purity, but manufacturing costs disadvantageously increase because tri-color light-emitting diodes are very expensive. Techniques for remedying these shortcomings have been proposed, in which a relatively inexpensive blue light-emitting diode is used as a light source and white light is realized by converting blue light into red light and green light using a light conversion film including quantum dots (QDs).

Meanwhile, quantum dots are easily oxidized by moisture, oxygen, and heat. Accordingly, currently proposed light conversion films are generally manufactured in such a way that a barrier film for preventing permeation of moisture and oxygen is attached on upper and lower surfaces of the light conversion film. However, these conventional light conversion films do not include a separate barrier unit on the sides thereof, so that problems such as quantum dot oxidation by oxygen or moisture permeating through the sides of the film still occur, thereby resulting in reliability degradation due to moisture or heat when the light conversion film is applied to a backlight unit. In order to solve these problems, methods for increasing quantum dot density in the light conversion film are being considered. However, when the quantum dot density in the light conversion film increases, the proportion of red light and/or green light converted by quantum dots also increases. As a result, RGB color balance is broken, which causes a change in white color coordinates.

SUMMARY

The present disclosure provides a light conversion member having excellent reliability and white balance characteristics, and a backlight unit and a display device including the same.

In one embodiment, a light conversion member includes: at least one light conversion layer including quantum dots; and at least one band-pass filter which reduces transmittance of light having a wavelength band of 480 nm or more.

In another embodiment, a backlight unit includes: a light source unit including a plurality of light sources; and a light conversion member which includes at least one light conversion layer including quantum dots and at least one band-pass filter which reduces transmittance of light having a wavelength band of 480 nm or more.

In further another embodiment, a display device includes: a backlight unit which includes a light source unit including a plurality of light sources, and a light conversion member which includes at least one light conversion layer including quantum dots and at least one band-pass filter which reduces transmittance of light having a wavelength band of 480 nm or more; and a display panel which is displaced on the backlight unit.

The details of one or more embodiments are set forth in the accompanying drawings and the description below. Other features will be apparent from the description and drawings, and from the claims.

DETAILED DESCRIPTION OF THE EMBODIMENTS

Hereinafter, the present disclosure will be described in detail with reference to the accompanying drawings.

Advantages and features of the present disclosure, and implementation methods thereof will become apparent with embodiments described below with reference to the accompanying drawings. The present disclosure may, however, be embodied in different forms and should not be construed as limited to the embodiments set forth herein. The embodiments described herein are provided so that this disclosure will be thorough and complete, and will fully convey the scope of the present disclosure to those skilled in the art. Further, the present invention is defined by scopes of claims.

The shape, dimension, ratio, angle, and number disclosed in the drawings to describe embodiments of the present disclosure are exemplary, and the present disclosure should not be limited to the drawings. Like reference numerals or symbols refer to like elements throughout this specification. In the description of the present disclosure, a detailed description of the well-known technique will be omitted to avoid making the subject matter of the present disclosure unclear.

In this specification, terms such as 'include', 'including', 'comprise', 'comprising', 'have', 'having', or 'comprised of', should be construed as not excluding the existence or addibility of other features, unless terms such as 'only' are used. Terms in the singular form used for describing elements may include the plural form unless otherwise stated.

In interpreting the elements, the elements should be construed as including a margin of error even if there is no explicit description.

In the description of positional relationship, for example, in the case where positional relationship between two parts is described by using terms such as 'on', 'above', 'under', and 'beside', one or more other parts may also be disposed between the two parts unless terms such as 'exactly' or 'directly' are used.

In the description of temporal relationship, for example, in the case where temporal order is described by using terms such as 'after', 'subsequently', 'following', and 'before', the temporal order may be discontinuous unless terms such as 'exactly' or 'directly' are used.

Terms of "first" or "second" may be used to describe various elements, but the elements should not be limited to these terms. These terms are used only to differentiate one element from another one. Therefore, a first element may be named as a second element and vice versa without departing from the scope of the inventive concept.

In various embodiments in the present disclosure, each feature thereof may be partially or entirely combined or assembled, technically various interconnections and driving may be realized, and each embodiment may be carried out independently or in conjunction with each other.

While conducting research in order to solve the problem of the change in white color coordinate when the content of quantum dot increases to improve reliability for moisture, oxygen, and heat, the present inventors found that the problem may be solved by applying a band-pass filter which reduces light transmittance of a specific wavelength band, and finally completed the present invention.

FIGS. 1 to 6 illustrate various embodiments of a light conversion member according to the present disclosure.

Figure 1A:
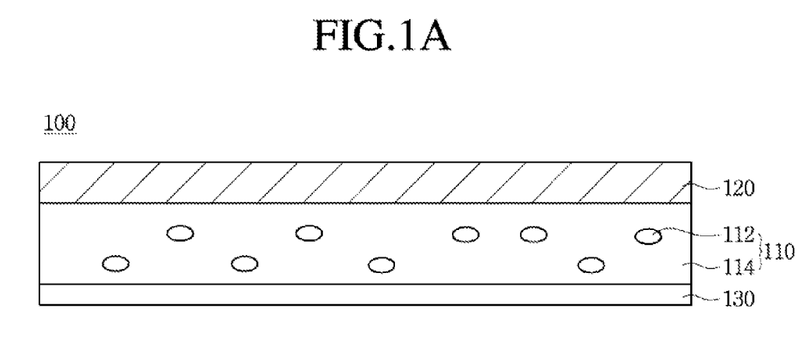
FIGS. 1A and 1B illustrate a first embodiment of a light conversion member according to the present disclosure.
Figure 1B:
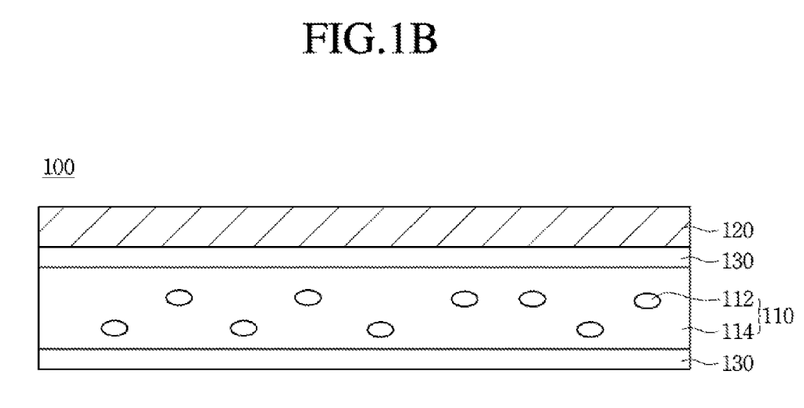

FIGS. 1A and 1B illustrate a light conversion member according to a first embodiment of the present disclosure. As illustrated in FIGS. 1A and 1B, the light conversion member 100 according to the first embodiment of the present disclosure includes at least of one light conversion layer 110 and at least one band-pass filter 120.

In this case, the light conversion layer 110 includes quantum dots (QDs, 112) which convert the wavelength of incident light.

The quantum dot 112 means a luminescent nanoparticle having a predetermined size and a quantum confinement effect. The quantum dot 112 is a semiconductor crystal which is prepared using a chemical synthesizing process and has a few nanometer size, and converts the wavelength of light injected from a light source to emit the wavelength-converted light.

The quantum dot 112 may be, for example, a particle having a single layered or multi-layered structure which includes at least one semiconductor crystal selected from the group consisting of CdS, CdO, CdSe, CdTe, $Cd_3P_2$, $Cd_3As_2$, ZnS, ZnO, ZnSe, ZnTe, MnS, MnO, MnSe, MnTe, MgO, MgS, MgSe, MgTe, CaO, CaS, CaSe, CaTe, SrO, SrS, SrSe, SrTe, BaO, BaS, BaSe, BaTE, HgO, HgS, HgSe, HgTe, $HgI_2$, AgI, AgBr, $Al_2O_3$, $Al_2S_3$, $Al_2Se_3$, $Al_2Te_3$, $Ga_2O_3$, $Ga_2S_3$, $Ga_2Se_3$, $Ga_2Te_3$, $In_2O_3$, $In_2S_3$, $In_2Se_3$, $In_2Te_3$, $SiO_2$, $GeO_2$, $SnO_2$, SnS, SnSe, SnTe, PbO, $PbO_2$, PbS, PbSe, PbTe, AlN, AlP, AlAs, AlSb, GaN, GaP, GaAs, GaSb, $GaInP_2$, InN, InP, InAs, InSb, $In_2S_3$, $In_2Se_3$, $TiO_2$, BP, Si, Ge, and combinations thereof.

The quantum dot 112 may have a diameter of about 1 to 10 nm. The luminescent wavelength of the quantum dot depends on the size thereof, so that light of a desired color may be obtained by selecting quantum dots having an appropriate size. The quantum dots may, for example, include red light-emitting quantum dots, green light-emitting quantum dots, or a combination thereof.

Although not illustrated, the quantum dot 112 may include a capping layer on the surface thereof in order to prevent aggregation therebetween. The capping layer may be a ligand layer which is coordinate-bonded to the surface of the quantum dot, or a surface layer coated with hydrophobic organic molecules.

For example, the capping layer may be made of materials selected from the group consisting of nonpolar phosphine oxide having a long-chain alkyl or aryl group, organic amine, organic acids, phosphonic acids, and combinations thereof. For example, the capping layer may be made of materials selected from the group consisting of tri-n-octyl phosphine oxides (TOPOs), stearic acids, palmitic acids, octadecylamine, hexadecylamine, dodecylamine, lauric acids, oleic acids, hexylphosphonic acids, and combinations thereof.

The quantum dots 112 may be in the form of an aggregate in which one or more quantum dots are aggregated, or a quantum dot-polymer composite which is formed by coupling of a quantum dot and a polymer.

In the present disclosure, the light conversion layer 110 may be prepared in such a form that the quantum dots 112 are dispersed in a matrix resin layer 114. In this case, the matrix resin 114 is not particularly limited, but may be any quantum dot dispersible resin.

For example, a resin including an acrylic monomer in which quantum dots are readily dispersed, such as lauryl acrylate, lauryl methacrylate, and isobornyl methacrylate, may be used as the matrix resin 114.

Alternatively, a resin having characteristics of low moisture permeation and low air permeation may be used as the matrix resin 114 in terms of prevention of quantum dot deterioration. The quantum dots 112 are easily deteriorated by oxygen, moisture, or the like. Therefore, in order to prevent the deterioration of the quantum dots 112, it is preferable that a resin having characteristics of low moisture permeation and low air permeation is used as the matrix resin 114 surrounding the quantum dots 112. Examples of the matrix resin may include, but are not limited to, epoxy, epoxy acrylate, polychlorotrifluoroethylene, polyethylene, polypropylene, polyvinyl alcohol, or a combination thereof.

In this case, the epoxy resin includes an epoxy group, and may be, for example, a bisphenol A resin or a bisphenol F resin. These epoxy resins have low moisture permeability and low air permeability due to characteristics of main chain.

The epoxy acrylate resin is obtained by substituting the epoxide group in the epoxy resin with an acrylic group. For example, the epoxy acrylate resin may be any one selected from the group consisting of bisphenol A glycerolate diacrylate, bisphenol A ethoxylate diacrylate, bisphenol A glycerolate dimethacrylate, bisphenol A ethoxylate dimethacrylate, and a combination thereof. The epoxy acrylate resin has low moisture permeability and low air permeability due to characteristics of main chain as in the epoxy resin.

Furthermore, the polychlorotrifluoroethylene has low moisture permeability and low oxygen permeability, the polyethylene and the polypropylene have low moisture permeability, and the polyvinyl alcohol has low oxygen permeability.

When the aforesaid matrix resins having low moisture permeability and low air permeability are used, it is possible to achieve an effect of minimizing the deterioration of quantum dots caused by oxygen and moisture.

Next, the band-pass filter 120 is to adjust color balance by reducing light transmittance of a specific wavelength band, and more particularly, reduces transmittance of light having a wavelength band of 480 nm or more to a level less than 100%, preferably to about 95% or less, more preferably to about 85 to 95%, and even more preferably to about 90 to 95%. In this case, the light transmittance means (amount of light emitted from the band-pass filter/amount of light incident to the band-pass filter)×100.

The wavelength band of the band-pass filter 120 for reducing light transmittance may be properly adjusted according to the type and/or content of quantum dots included in the light conversion layer 110. For example, when the light conversion layer 110 includes only red light-emitting quantum dots, the band-pass filter 120 may be designed such that light transmittance of a red wavelength band, that is, a wavelength band of 580 to 780 nm, is less than 100%, preferably about 95% or less, more preferably about 85 to 95%, and even more preferably about 90 to 95%.

Alternatively, when the light conversion layer 110 includes only green light-emitting quantum dots, the band-pass filter 120 may be designed such that light transmittance of a green wavelength band, that is, a wavelength band of 480 to 600 nm, is less than 100%, preferably about 95 or less, more preferably about 85 to 95%, and even more preferably about 90 to 95%.

Alternatively, when the light conversion layer 110 includes both red light-emitting quantum dots and green light-emitting quantum dots, the band-pass filter 120 may be designed such that light transmittance of a wavelength band of 480 to 780 nm, is less than 100%, preferably about 95% or less, more preferably about 85 to 95%, and even more preferably about 90 to 95%.

The band-pass filter 120 may have, but is not limited to, a multi-layered thin film structure in which a low refractive index layer and a high refractive index layer are alternately laminated. In this case, light transmittance of a specific wavelength band may be adjusted by controlling constituent materials, thicknesses, refractive indices, or number of layers of the low refractive index layer and the high refractive index layer.

The low refractive index layer means a layer having a relatively low refractive index of the multi-layered thin films forming the band-pass filter, such as a layer having a refractive index of 1.5 or less, preferably about 1.38 to 1.5. The high refractive index layer means a layer having a relatively high refractive index of the multi-layered thin films forming the band-pass filter, such as a layer having a refractive index of 1.6 or more, preferably about 1.6 to 1.8.

Materials forming the low refractive index layer and the high refractive index layer are not particularly limited, but may be any the material which satisfies the aforesaid refractive index characteristics. That is, the low refractive index layer and the high refractive index layer may be made of organics, inorganics, organic-inorganic composites, or the like. For example, the low refractive index layer may be made of, but is not limited to, $MgF_2$, $SiO_2$, or $ThF_4$, and the high refractive index layer may be made of, but is not limited to, $CeF_3$, $TiO_2$, $ZrO_2$, $Ta_2O_5$, $HfO_2$, $Nb_2O_5$ or $Nd_2O_3$.

Meanwhile, when the low refractive index layer and the high refractive index layer of the band-pass filter are made of inorganics, the layers have low oxygen and/or moisture permeability, and may thus serve as a barrier film as well as a light transmittance reducing layer. In this case, it is not necessary to attach a barrier film between the light conversion layer and the band-pass filter, which gives an advantage in terms of easy realization of thin devices.

Meanwhile, in the present disclosure, it is preferable that total number of layers of the band-pass filter is about 20 to 60, and overall thickness thereof is about 5 to 8 μm. When the number of layers and thickness of the band-pass filter satisfy the above ranges, the light transmission reducing effect may be effectively obtained.

Figure 6:
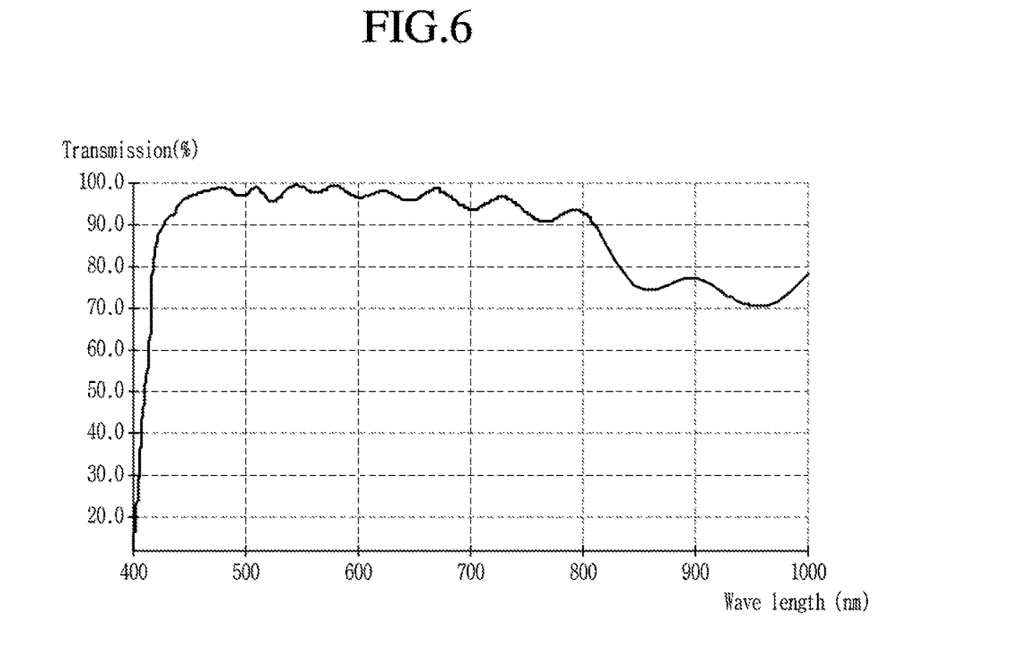
FIG. 6 is a graph showing light transmittance characteristics of a band-pass filter according to the present disclosure.

FIG. 6 is a graph showing light transmittance according to the wavelength band of a band-pass filter which is prepared in such a way that $MgF_2$ (refractive index: about 1.4) and $CeF_3$ (refractive index: about 1.6) are alternately deposited with thicknesses indicated in Table 1 below. From FIG. 6, it can be seen that light transmittance of a specific wavelength band may be reduced using a band-pass filter having a multi-layered thin film structure in which a low refractive index layer and a high refractive index layer are alternately laminated.

TABLE 1

| Layer | Material | Thickness(nm) |
|---|---|---|
| 1 | $MgF_2$ | 65.41 |
| 2 | $CeF_3$ | 31.68 |
| 3 | $MgF_2$ | 71.64 |
| 4 | $CeF_3$ | 76.72 |
| 5 | $MgF_2$ | 62.90 |
| 6 | $CeF_3$ | 69.44 |
| 7 | $MgF_2$ | 80.07 |
| 8 | $CeF_3$ | 69.44 |
| 9 | $MgF_2$ | 80.07 |
| 10 | $CeF_3$ | 69.44 |
| 11 | $MgF_2$ | 80.07 |
| 12 | $CeF_3$ | 69.44 |
| 13 | $MgF_2$ | 80.07 |
| 14 | $CeF_3$ | 69.44 |
| 15 | $MgF_2$ | 80.07 |
| 16 | $CeF_3$ | 69.44 |
| 17 | $MgF_2$ | 80.07 |
| 18 | $CeF_3$ | 69.44 |
| 19 | $MgF_2$ | 80.07 |
| 20 | $CeF_3$ | 69.44 |
| 21 | $MgF_2$ | 58.76 |
| 22 | $CeF_3$ | 74.68 |
| 23 | $MgF_2$ | 234.51 |
| 24 | $CeF_3$ | 155.56 |

TABLE 1-continued

| Layer | Material | Thickness(nm) |
|---|---|---|
| 25 | MgF$_2$ | 177.72 |
| 26 | CeF$_3$ | 147.22 |
| 27 | MgF$_2$ | 170.38 |
| 28 | CeF$_3$ | 143.06 |
| 29 | MgF$_2$ | 166.71 |
| 30 | MgF$_2$ | 91.30 |

As illustrated in FIGS. 1A and 1B, the light conversion layer 100 of the present disclosure may further include a barrier film 130 on at least one surface of the light conversion layer 100. The barrier film is to prevent quantum dots in the light conversion layer from being deteriorated by moisture, oxygen, or the like in the outside air, and may include a single or composite material which has a high barrier property to moisture and/or oxygen. For example, the barrier film 130 may include a polymer which has a high barrier property to moisture and/or oxygen, such as polyethylene, polypropylene, polyvinylchloride, polyvinyl alcohol, ethylene vinyl alcohol, polychlorotrifluoroethylene, polyvinylidene chloride, nylon, polyamide ether, or cycloolefin-based homopolymer or copolymer.

Meanwhile, in the drawings, the barrier film 130 is illustrated as, but not limited to, a single layer. The barrier film 130 may also be formed in a multi-layer, and for example, may have a structure in which a protective layer is laminated on a base substrate. More specifically, the barrier film 130 may be in the form in which an inorganic or organic-inorganic hybrid film having a high barrier property to moisture and/or oxygen is coated on a base substrate, and the inorganic or organic-inorganic hybrid film may be mainly composed of oxides or nitrides of Si, Al, etc. In this case, as the base substrate, a polymer film having high light transmittance and heat resistance may be used, and for example, a polymer film including polyethyleneterephthalate (PET), polyethylene naphthalate (PEN), cyclic olefin copolymers (COC), cyclic olefin polymers (COP), or the like may be used.

It is preferable that the barrier film 130 has a moisture permeability of about $10^{-1}$ to $10^{-5}$ g/m$^2$/day under 37.8 r and 100% relative humidity conditions, and an air permeability of about $10^{-1}$ to $10^{-2}$ cc/m$^2$/day/atm under 23 t and 0% relative humidity conditions.

Furthermore, it is preferable that the barrier film 130 has a linear transmittance of about 88 to 95% in a visible light region of 420 to 680 nm.

Furthermore, it is preferable that the barrier film 130 has a thickness of about 20 to 100 μm.

The barrier film 130 may be disposed on a surface of the light conversion layer 110 as illustrated in FIG. 1A, or disposed on both surfaces of the light conversion layer 110 as illustrated in FIG. 1B. As described above, when the low refractive index layer and the high refractive index layer of the band-pass filter 120 are formed of inorganics, the layers may perform a barrier function to prevent permeation of oxygen and/or moisture etc. Therefore, in this case, a separate barrier film may not be provided at the side where the band-pass filters 120 are laminated, the barrier film 130 may thus be formed, as illustrated in FIG. 1A, only on the surface opposite to a surface where the band-pass filter 120 are laminated. However, when the band-pass filter 120 is formed of organics, the barrier film 130 is preferably disposed on both surfaces of the light conversion layer 110, and in this case, the barrier film 130 may be disposed, as illustrated in FIG. 1B, under the light conversion layer 110, and between the light conversion layer 110 and the band-pass filter 120.

Figure 2:
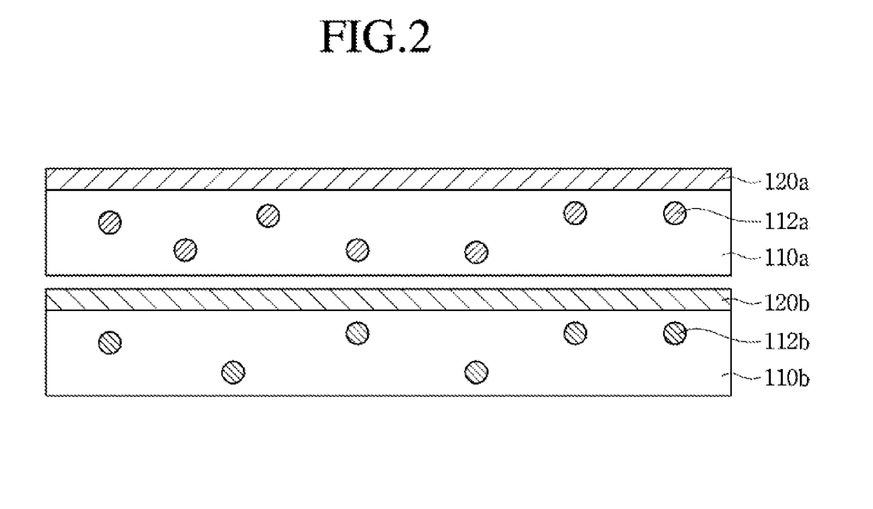
FIG. 2 illustrates a second embodiment of a light conversion member according to the present disclosure.

Next, a light conversion member according to a second embodiment of the present disclosure will be described with reference to FIG. 2. As illustrated in FIG. 2, the light conversion member according to the second embodiment of the present disclosure includes a first light conversion layer 110a including quantum dots, a first band-pass filter 120a disposed on the upper surface of the first light conversion layer 110a, a second light conversion layer 110b including quantum dots, and a second band-pass filter 120b disposed on the upper surface of the second light conversion layer 110b.

In this case, the first and second light conversion layers 110a and 110b are configured to be capable of converting incident light into light of different wavelength bands. For example, the first light conversion layer 110a may include red light-emitting quantum dots 112a, and the second light conversion layer 110b may include green light-emitting quantum dots 112b. In this case, the first band-pass filter 120a may be disposed on the upper surface of the first light conversion layer 110a, and may reduce transmittance of light having a red light wavelength band, that is, a wavelength band of 580 to 780 nm, to a level less than 100%, preferably to about 95% or less, more preferably about 85 to 95 and even more preferably about 90 to 95%. Also, the second band-pass filter 120b may be disposed on the upper surface of the second light conversion layer 110b, and may reduce transmittance of light having a green light wavelength band, that is, a wavelength band of 480 to 600 nm, to a level less than 100%, preferably to about 95% or less, more preferably about 85 to 95%, and even more preferably about 90 to 95%.

Meanwhile, in FIG. 2, the first light conversion layer 110a including red quantum dots 112a and the first band-pass filter 120a are illustrated to be disposed over the second band-pass filter 120b and the second light conversion layer 110b including green quantum dots 112b, but the present disclosure is not limited thereto, rather the second light conversion layer 110b and the second band-pass filter 120b may be disposed over the first light conversion layer 110a and the first band-pass filter 120a.

Although not illustrated in the drawings, the first and second light conversion layers 110a and 110b may further include a barrier film on at least one surface thereof. In this case, placement of a barrier film may be variously selected. For example, the barrier film may be respectively disposed on both surfaces of the first light conversion layer 110a and both surfaces of the second light conversion layer 110b. Alternatively, the barrier film may be disposed between the first light conversion layer 110a and the second band-pass filter 120b, and on the lower surface of the second light conversion layer 110b. Alternatively, when the first and second band-pass filters 120a and 120b are made of an inorganic multi-layered thin film, the barrier film may be disposed only on the lower surface of the second light conversion layer 110b. Details on the light conversion layer, the band-pass filter, and the barrier film other than the above description are the same as in the first embodiment, a detailed description thereof will thus be omitted.

Figure 3A:
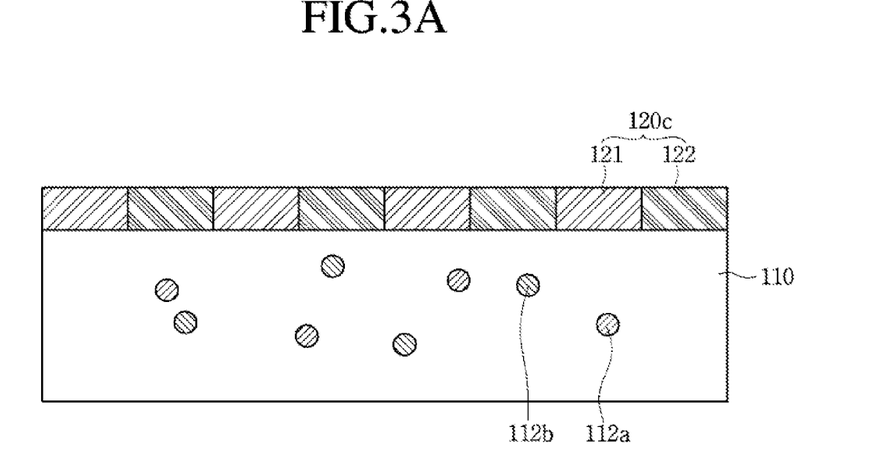
FIGS. 3A and 3B illustrate a third embodiment of a light conversion member according to the present disclosure.
Figure 3B:
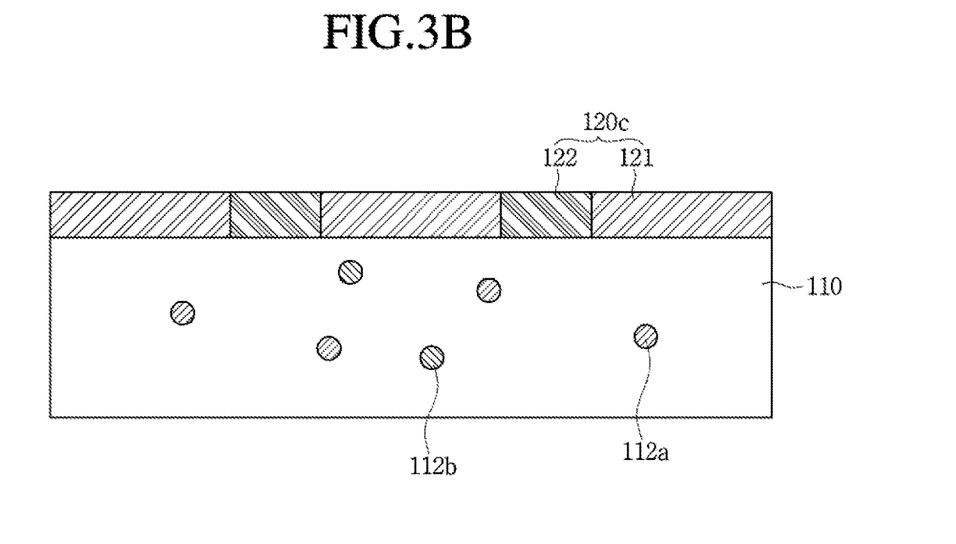

Next, a light conversion member according to a third embodiment of the present disclosure will be described with reference to FIGS. 3A and 3B. As illustrated in FIGS. 3A and 3B, the light conversion member according to the third embodiment of the present disclosure includes a light conversion layer 110 including red light-emitting quantum dots 112*a* and green light-emitting quantum dots 112*b*, and a band-pass filter 120*c* (hereinafter, referred to as a third band-pass filter) which is patterned to adjust light transmittance of different wavelength bands.

More specifically, the third band-pass filter 120*c* includes a first region 121 which reduces light transmittance of a red light wavelength band, that is, a wavelength band of 580 to 780 nm, to a level less than 100%, preferably to about 95% or less, more preferably about 85 to 95%, and even more preferably about 90 to 95%, and a second region 122 which reduces light transmittance of a green light wavelength band, that is, a wavelength band of 480 to 600 nm, to a level less than 100 preferably to about 95% or less, more preferably about 85 to 95%, and even more preferably about 90 to 95%. When the band-pass filter is patterned to adjust light transmittance of different wavelength bands by regions as described above, transmittance amount of red light and green light may advantageously adjusted without an increase in overall thickness of the light conversion member.

Meanwhile, it is preferable that the first and second regions 121 and 122 are disposed alternately to each other, but the present disclosure is not limited thereto. Furthermore, areas of the first and second regions 121 and 122 may be properly adjusted in consideration of the content of red light-emitting quantum dot and green light-emitting quantum dot included in the light conversion layer 110. For example, the first and second regions 121 and 122 may have the same area, as illustrated in FIG. 3A, and may have different areas, as illustrated in FIG. 3B.

Although not illustrated in the drawings, the light conversion layer 110 may further include a barrier film on at least one surface thereof.

Details on the light conversion layer, the band-pass filter, and the barrier film other than the above description are the same as in the first embodiment, a detailed description thereof will thus be omitted.

Figure 4:
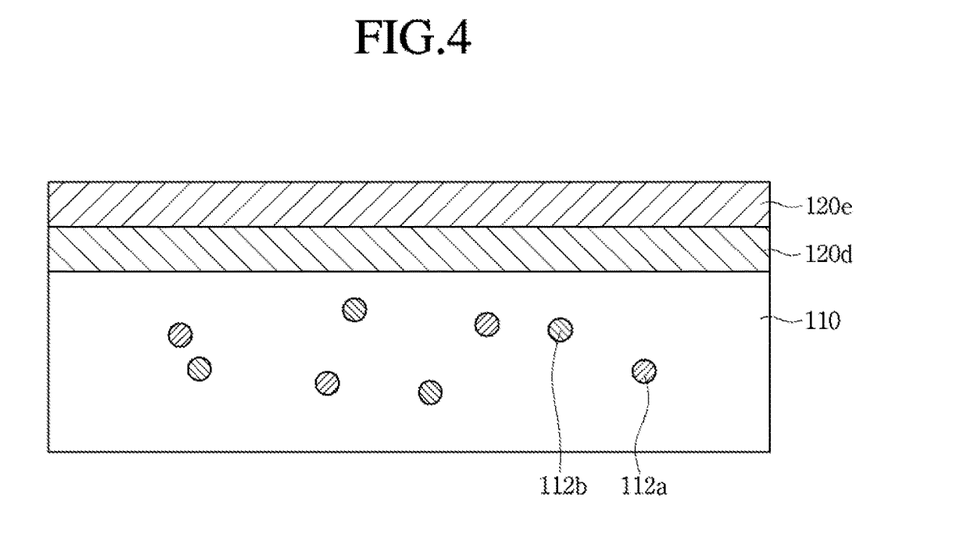
FIG. 4 illustrates a fourth embodiment of a light conversion member according to the present disclosure.

Next, a light conversion member according to a fourth embodiment of the present disclosure will be described with reference to FIG. 4. As illustrated in FIG. 4, the light conversion member according to the fourth embodiment of the present disclosure includes a light conversion layer 110 including red light-emitting quantum dots 112*a* and green light-emitting quantum dots 112*b*, and fourth and fifth band-pass filters 120*d* and 120*e* which are sequentially disposed on the upper surface of the light conversion layer.

In this case, the fourth and fifth band-pass filters 120*d* and 120*e* may have different wavelength bands where light transmittance is reduced. For example, the fourth band-pass filter 120*d* may reduce light transmittance of a green light wavelength band, that is, a wavelength band of 480 to 600 nm, to a level less than 100%, preferably to about 95% or less, more preferably about 85 to 95%, and even more preferably about 90 to %, and the fifth band-pass filter 120*e* may reduce light transmittance of a red light wavelength band, that is, a wavelength band of 580 to 780 nm, to a level less than 100%, preferably to about 95% or less, more preferably about 85 to 95%, and even more preferably about 90 to 95%.

Although not illustrated in the drawing, the light conversion layer 110 may further include a barrier film on at least one surface thereof.

Details on the light conversion layer, the band-pass filter, and the barrier film other than the above description are the same as in the first embodiment, a detailed description thereof will thus be omitted.

Figure 5:
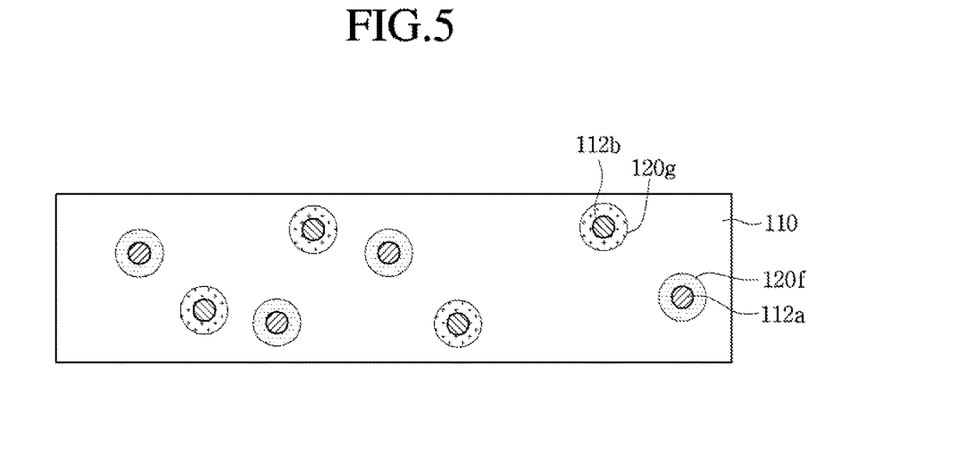
FIG. 5 illustrates a fifth embodiment of a light conversion member according to the present disclosure.

Next, a light conversion member according to a fifth embodiment of the present disclosure will be described with reference to FIG. 5. As illustrated in FIG. 5, the light conversion member according to the fifth embodiment of the present disclosure includes a light conversion layer 110 including red light-emitting quantum dots 112*a* and green light-emitting quantum dots 112*b*, a sixth band-pass filter 120*f* which is coated on the surface of the red light-emitting quantum dot 112*a*, and a seventh band-pass filter 120*g* which is coated on the surface of the green light-emitting quantum dot 112*b*. In this case, the sixth band-pass filter 120*f* may reduce light transmittance of a red light wavelength band, that is, a wavelength band of 580 to 780 nm, to a level less than 100% preferably to about 95% or less, more preferably about 85 to 95%, and even more preferably about 90 to 95%, and the seventh band-pass filter 120*g* may reduce light transmittance of a green light wavelength band, that is, a wavelength band of 480 to 600 nm, to a level less than 100%, preferably to about 95% or less, more preferably about 85 to 95%, and even more preferably about 90 to 95%.

Although not illustrated in the drawing, the light conversion layer 110 may further include a barrier film on at least one surface thereof.

When the band-pass filter is formed as being coated on the surface of the quantum dot, it is possible to make a thin light conversion member, and an effect of preventing the deterioration of the quantum dot may also be obtained because the band-pass filter prevents the quantum dot from being exposed to moisture or air.

Other elements are the same as in the first embodiment except that the band-pass filter is formed as being coated on the surface of the quantum dot, a detailed description thereof will thus be omitted.

As described above, in the case of the light conversion member of the present disclosure, including the band-pass filter which reduces light transmittance of a specific wavelength band to a level less than 100%, transmittance of red light and green light caused by quantum dots is adjusted by the band-pass filter, so that white balance may be maintained in the conventional level even with a light conversion layer including high content of the quantum dots compared with the prior art, and both reliability and color characteristics may thus be satisfied.

Next, a backlight unit and a display device of the present disclosure will be described.

Figure 7:
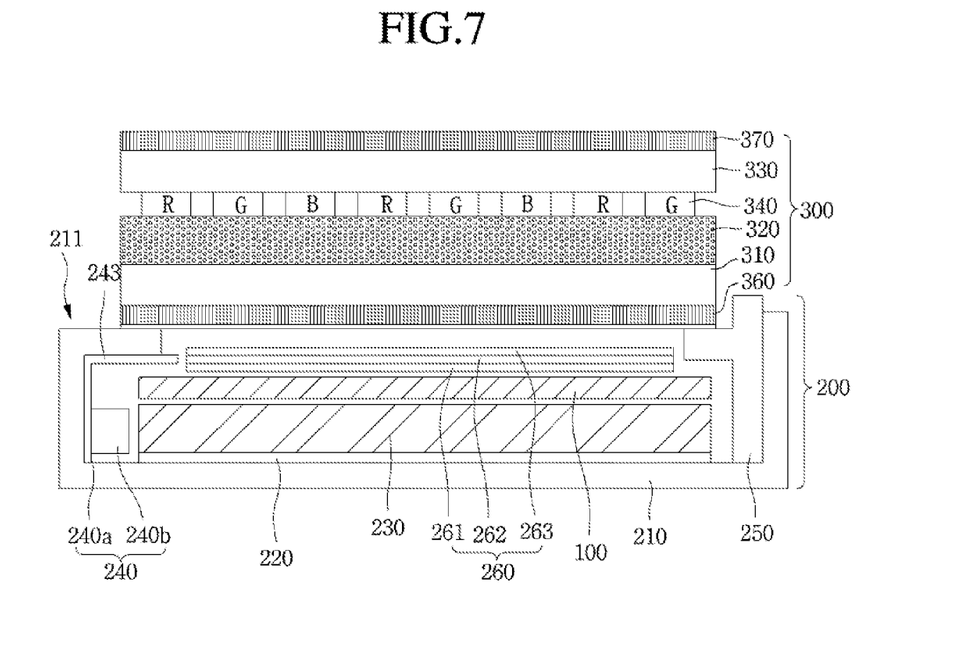
FIG. 7 illustrates an embodiment of a display device according to the present disclosure.

FIG. 7 illustrates an embodiment of a display device according to the present disclosure. As illustrated in FIG. 7, the display device of the present disclosure includes a backlight unit 200 and a display panel 300.

The backlight unit 200 and display device are characterized by including the light conversion member 100 according to the present disclosure, that is, the light conversion member 100 including at least one light conversion layer including quantum dots and at least one band-pass filter which reduces transmittance of light having a wavelength band of 480 nm or more.

More specifically, the backlight unit 200 is to provide the display panel 300 with light, and includes a light source unit 240 and the light conversion member 100 according to the present disclosure. The backlight unit 200 may further include a bottom case 210, a reflecting plate 220, a light guide plate 230, a guide panel 250, an optical sheet 260, and the like, if necessary. The light conversion member 100 has been described above in detail, and hereinafter, a description will be given of the remaining elements other than the light conversion member 100.

First, the light source unit 240 is to provide the display panel 300 with light, and may be disposed within the bottom case 210.

The light source unit 240 includes, for example, a plurality of light sources 240b and a printed circuit board 240a on which the plurality of light sources 240b are mounted. More specifically, the light source unit 240 may include a blue light source such as a blue light-emitting diode, a green light source such as a green light-emitting diode, or a combination thereof.

For example, the light source unit 240 may be configured to provide blue light. In this case, the light source unit 240 includes, as the light source 240b, a blue light source such as a blue light-emitting diode which generates blue light, and the light conversion member 100 may be used as including, in a light conversion layer, both red light-emitting quantum dots and green light-emitting quantum dots which convert incident light into red light and green light, respectively.

Alternatively, the light source unit 240 may be configured to provide blue light and green light. In this case, the light source unit 240 may include, as the light source 240b, both a blue light source such as a blue light-emitting diode which generates blue light and a green light source such as a green light-emitting diode which generates green light, or may include, as the light source 240b, a light-emitting diode package including a blue light-emitting diode and a green phosphor layer. In this case, the light conversion member 100 may be used as including, in a light conversion layer, red light-emitting quantum dots which convert incident light into red light.

Meanwhile, the printed circuit board 240a is electrically connected to the light source 240b. The light source 240b may be driven by receiving a driving signal via the printed circuit board 240a.

The printed circuit board 240a includes a mounting surface on which the light source 240b is mounted, and an adhesion surface opposite to the mounting surface. The adhesion surface of the printed circuit board 240a is attached to the bottom case 210. The printed circuit board 240a may have a bar shape, and may be disposed on one side of the bottom case 210.

In the drawing, it is illustrated that the printed circuit board 240a is attached on the inner side of the bottom case 210, but the present disclosure is not limited thereto. The printed circuit board 240a may be attached on the inner upper surface of the bottom case 210, or on the lower surface of a bent extension part 211 of the bottom case 210.

In the drawing, it is illustrated that the light source unit 240 is disposed on one side of the bottom case 210, but the present disclosure is not limited thereto. The light source unit 240 may be disposed on both sides facing each other within the bottom case 210. Although an edgy type backlight unit 200 is illustrated in the drawings, the backlight unit 200 may be a direct type backlight unit 200. That is, the light source unit 240 may be disposed on the inner upper surface of the bottom case 210.

Meanwhile, the bottom case 210 has an open-top shape. Furthermore, the bottom case 210 has side walls extending in a closed curve to receive the light source unit 240, the light guide plate 230, the reflecting plate 220, the optical sheet 260, and the light conversion member 100. In this case, at least one side wall of the bottom case 210 may include the bent extension part 211 which is bent and extends from the upper edge to cover the light source unit 240. That is, the cross section of a side of the bottom case 210 may have a shape like '⌐'. In this case, a reflecting member 243 may be further disposed on the lower surface of the bent extension part 211.

The reflecting member 243 may be a light source housing, a reflecting film, or a reflecting tape. The reflecting member 243 may prevent light of the light source unit 240 from directly emitting to the display panel 300. Furthermore, the reflecting member 243 may increase the amount of light incident into the light guide plate 230. Accordingly, the reflecting member 243 may improve light efficiency, luminance, and image quality of the display device.

Alternatively, the bottom case 210 may not include the bent extension part 211. That is, the cross section of a side of the bottom case 210 may have a shape like '⌐'. This bottom case 210 are coupled with the guide panel 250.

The guide panel 250 includes a protrusion part protruding to the inside. The display panel 300 may be seated and supported on the protrusion part of the guide panel 250. The guide panel 250 may also be referred to as a support main or a mold frame.

The guide panel 250 is disposed around the edge of the backlight unit 200 in order to adhere to the display panel 300. That is, the guide panel 250 has a frame shape. For example, the guide panel 250 may have a shape of a rectangular frame. Furthermore, the guide panel 250 may have an opening in a region corresponding to the bent extension part 211 of the bottom case 210.

Although not illustrated in the drawing, the bottom case 210 and the guide panel 250 may be assembled with each including a hook, or may be assembled and coupled including a protrusion part and a recession part, respectively. Alternatively, the bottom case 210 and the guide panel 250 may be adhered using an adhesive member. However, the present disclosure is not limited to the drawing, but the guide panel 250 may be disposed on the light source unit 240. In this case, a reflecting member 243 may be disposed on the lower surface of the guide panel 250 corresponding to the light source unit 240.

Next, the light guide plate 230 serves to uniformly guide light provided from the light source unit 240 to the display panel 300 through total reflection, refraction, and scattering. Herein, the light guide plate 230 is received within the bottom case 210.

Although, in the drawing, it is illustrated that the light guide plate 230 is formed to have a uniform thickness, the form of the light guide plate 230 is not limited thereto. For example, the light guide plate 230 may be thinner at the central portion than both sides thereof in order to reduce overall thickness of the backlight unit 200, and may be thinner as the distance increases from light source unit 240.

Furthermore, the light guide plate 230 may include a particular shaped pattern on a surface thereof in order to provide a uniform surface light source. For example, the light guide plate 230 may include various patterns such as an elliptical pattern, a polygon pattern, and a hologram pattern, in order to guide light incident to the inside thereof.

Although, in the drawing, it is illustrated that the light source unit 240 is disposed to correspond to a side of the light guide plate 230, the present disclosure is not limited thereto. The light source unit 240 may be disposed to correspond to at least one surface of the light guide plate 230. For example, the light source unit 240 may be disposed to correspond to a side or both sides of the light guide plate 230, and may also be disposed to correspond to the lower surface of the light guide plate 230.

The reflecting plate 220 is disposed along the travelling path of light emitted from the light source unit 240. Particularly, the reflecting plate 220 is disposed between the light guide plate 230 and the bottom case 210. That is, the reflecting plate 220 is disposed under the light guide plate 230. The reflecting plate 220 may serve to increase light efficiency by reflecting light which travels toward the upper surface of the bottom case 210 to the light guide plate 230.

Contrary to the drawing, when the light source unit 240 is disposed to correspond to the lower surface of the light guide plate 230, the reflecting plate 220 may be disposed on the light source unit 240. Particularly, the reflecting plate 220 is disposed on the printed circuit board 240*a* of the light source unit 240. Furthermore, the optical member 220 may include a plurality of holes so that the plurality of light sources 240*b* are coupled thereto.

That is, the plurality of light sources 240*b* are inserted to the plurality of holes of the reflecting plate 220, and the light source 240*b* may be exposed to the outside through the hole. Thus, the reflecting plate 220 may also be disposed on the side of the light source 240*b*, on the printed circuit board 240*a*.

An optical sheet 260 for diffusion and condensing is disposed on the light guide plate 230. For example, the optical sheet 260 may include a diffusion sheet 261, a first prism sheet 262, and a second prism sheet 263.

The diffusion sheet 261 is disposed on the light guide plate 230. The diffusion sheet 261 improves the uniformity of light passing through. The diffusion sheet 261 may include a plurality of beads.

The first prism sheet 262 is disposed on the diffusion sheet 261. The second prism sheet 263 is disposed on the first prism sheet 262. The first and second prism sheets 262 and 263 increase the linearity of light passing through. Accordingly, light emitted to the light guide plate 230 passes through the diffusion sheet 260, and may thus be processed into a surface light source having higher luminance.

The light conversion member 100 according to the present disclosure may be disposed between the diffusion sheet 260 and the light guide plate 230.

Next, the display panel 300 is to realize a screen, and may be, for example, a liquid crystal display (LCD) panel. For example, the display panel 300 includes a upper substrate 330, a lower substrate 310 spaced from the upper substrate 330, and a liquid crystal layer 320 disposed between the upper and lower substrates 330 and 310. Furthermore, an upper polarizing plate 370 and a lower polarizing plate 360, which selectively transmit only specific polarized light, are disposed on the upper surface of the upper substrate 330 and the back surface of the lower substrate 310, respectively.

Although not specifically illustrated, the display panel is divided into a display region and a non-display region. In the display region, gate lines and data lines are disposed on a surface of the lower substrate 310. The gate lines and data lines intersect perpendicularly to each other, with a gate insulation layer disposed therebetween, to define pixel regions.

The lower substrate 310 may be a thin film transistor substrate. On a surface of the lower substrate 310, a thin film transistor is disposed in a region where the gate line and the data line intersect with each other. That is, the pixel region includes the thin film transistor. Furthermore, on a surface of the lower substrate 310, a pixel electrode is disposed in each pixel region. The thin film transistor and the pixel electrode are electrically connected to each other.

The thin film transistor includes a gate electrode, a semiconductor layer, a source electrode, and a drain electrode. The gate electrode may be branched from the gate line. Also, the source electrode may be branched the data line. The pixel electrode may be electrically connected to the drain electrode of the thin film transistor.

The thin film transistor may have a structure such as a bottom gate structure, a top gate structure, or a double gate structure. That is, configuration of the thin film transistor may be variously changed or modified without departing from technical spirit the embodiments.

The upper substrate 330 may be a color filter substrate. On a surface of the upper substrate 330 of the display panel 300, a grid-like black matrix (not shown) is disposed, which covers the non-display region such as the thin film transistor formed on the lower substrate 310 and surrounds the pixel regions. Furthermore, within these grids, red color filters R, green color filters G, and blue color filters B, which are alternately disposed to correspond to each pixel region, may be included.

Furthermore, the display panel 300 includes a common electrode generating electric field with the pixel electrode in order to drive the liquid crystal layer. Examples of the method for controlling alignment of liquid crystal molecules include a Twisted Nematic (TN) mode, a Vertical Alignment (VA) mode, an In Plane Switching (IPS) mode, and a Fringe Field Switching (FFS) mode. The common electrode may be disposed on the upper substrate 330 or the lower substrate 310, depending on the method for controlling alignment of liquid crystal molecules.

Alternately, the display panel 300 may also have other structures other than the structure illustrated in the drawing. For example, the display panel may have a color filter on transistor (COT) structure in which the thin film transistor, the color filter, and the black matrix are formed on the lower substrate. In this case, a protective film may be formed between the thin film transistor and the color filter. Furthermore, a pixel electrode in contact with the thin film transistor is disposed on the lower substrate. In this case, in order to improve the aperture ratio and simplify the masking process, the black matrix may not be provided, but the common electrode may be formed to also serve as the black matrix.

Although not illustrated in the drawing, the display panel 300 is connected to a driving circuit unit (not shown) which supplies driving signals from the external. The driving circuit unit may be mounted on a substrate of the display panel 300, or connected to the display panel 300 via a connecting member such as a tape carrier package.

The light conversion member according to the present disclosure adjusts RGB color balance using a band-pass filter, so that excellent white balance characteristics may be maintained even with relatively high content of the quantum dots. Accordingly, the light conversion member according to the present disclosure may include high content of quantum dots compared with conventional quantum dot films, thereby resulting in excellent reliability for moisture and heat.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light conversion member, comprising:
   a light conversion layer comprising red light-emitting quantum dots that convert a blue light having a blue light wavelength band into a red light having a red light wavelength band, and green light-emitting quantum dots that convert the blue light into a green light having a green light wavelength band, the red light-emitting quantum dots and the green light-emitting quantum dots having a sphere shape;

a first band-pass filter surrounding a circumference of a corresponding red light-emitting quantum dot and having light transmittance of the red light of 85% to 95%; and a second band-pass filter surrounding a circumference of a corresponding green light-emitting quantum dot and having light transmittance of the green light of 85% to 95%.

2. A backlight unit, comprising:

a light source unit comprising a plurality of light sources; and the light conversion member according to claim 1.

3. The backlight unit according to claim 2, wherein the light source unit comprises a blue light-emitting diode.

4. A display device, comprising:

a backlight unit which comprises a light source unit comprising a plurality of light sources, and the light conversion member according to claim 1; and a display panel which is disposed on the backlight unit.

\* \* \* \* \*